(12) United States Patent
Gelormine et al.

(10) Patent No.: US 7,277,888 B2
(45) Date of Patent: Oct. 2, 2007

(54) METHOD FOR MINIMIZING REINTRODUCTION OF PARTICIPANTS AT SUCCESSIVE SOCIAL EVENTS

(75) Inventors: Vincent Gelormine, North Lauderdale, FL (US); Daniel Gudema, Sunny Isles Beach, FL (US)

(73) Assignee: Cupid Com/Predating, iNC., Plantation, FL (US)

( * ) Notice: Subject to any disclaimer, the term of this patent is extended or adjusted under 35 U.S.C. 154(b) by 633 days.

(21) Appl. No.: 10/700,649

(22) Filed: Nov. 4, 2003

(65) Prior Publication Data
US 2005/0096929 A1   May 5, 2005

(51) Int. Cl.
*G06F 17/00* (2006.01)
(52) U.S. Cl. ............................................. 707/6; 705/1
(58) Field of Classification Search .................. 463/42; 705/1, 9; 709/7, 8, 9, 223; 707/3, 6, 102
See application file for complete search history.

(56) References Cited
U.S. PATENT DOCUMENTS 5,920,845 A    7/1999  Risemberg
6,058,367 A *  5/2000  Sutcliffe et al. ............... 705/1
6,249,282 B1 * 6/2001  Sutcliffe et al. ............ 715/751
6,594,502 B1 * 7/2003  Koester .................. 455/414.1
6,931,393 B1 * 8/2005  Schreiber ....................... 707/3
6,934,739 B2 * 8/2005  Pietila ......................... 709/207

\* cited by examiner

*Primary Examiner*—Ronald Laneau
(74) *Attorney, Agent, or Firm*—Howard M. Gitten; Edwards Angell Palmer & Dodge LLP

(57) ABSTRACT

A method for minimizing the reintroduction of two people at a successive social event comprises the steps of assigning each person wishing to attend the successive social event a unique identifier, obtaining characteristic information about each person wishing to attend successive social events, the characteristic information having at least two potential values. An event identifier is assigned to at least said first social event and said successive social event. An event history associated with each unique identifier is created, the event history having elements corresponding to information about each event the person associated with the unique identifier has attended. A person is allowed to attend the successive social event dependent upon a rule for screening attendees, said rule being a function of said characteristic information and said event history.

18 Claims, 3 Drawing Sheets

METHOD FOR MINIMIZING REINTRODUCTION OF PARTICIPANTS AT SUCCESSIVE SOCIAL EVENTS

BACKGROUND OF THE INVENTION

1. Field of Invention

This invention generally relates to methods for arranging for attendees at a social event, and more particularly, to minimizing the chance that two attendees at a first event will simultaneously attend a second social event, and even more particularly when the social event is related to date matching services.

2. Background

Single individuals looking to meet new people for possible dating make use of a plurality of methods. Social events have been the long-standing vehicle for meeting potential date partners. Furthermore, recent advents, such as "speed-dating," singles dinner groups, and other in-person social events have been developed to facilitate the introduction of participants to one another with an offering service acting as mediator. With the advent of the Internet, virtual events, such as "online speed-dating" and "facilitated online chat" have also been for the sole purpose of introducing participants to one another in order to facilitate the dating process. The goal of these processes in a day and age of tight schedules and frenetic lifestyles is to maximize the number of potential partners one can come in contact with in a most efficient manner.

For example, a "speed-dating" service will introduce a single individual to as many as forty individuals through the vehicle of "mini-dates" at a single event. Each mini-date is a predetermined and prearranged interaction between the individual and a prospective partner during a window of opportunity from three to ten minutes. These mini-dates are arranged in seriatum, usually at a single location. In contrast, a singles dinner group will typically arrange six to eight single people to meet for dinner at a restaurant and sit at the same table. The service would facilitate the invitation of the people based upon predetermined criteria, arrange for the restaurant and arrange for the invitations. Online speed-dating or online chat introduction services facilitate online connections between an individual and many others, one connection at a time. This is done over the Internet through use of textual communication, audio communication or visual communication. Again, two individuals are paired for a limited window of opportunity, usually three to ten minutes. In all cases, each of the participants of each interaction decides following the event or communication whether or not they would like to communicate with any of the persons with which they have interacted in the future.

By way of example, in the case of speed-dating, this is done by indicating on a scorecard a "yes" or "no" for each person that the individual has met. When two parties indicate a mutual interest in each other, the service acting as a go-between brokers the exchange of contact information for those participants who matched. In other words, when any two people who have met during one of the speed-dating mini-dates each indicate that they would like to meet the other, the service will notify each of the participants that a match has occurred and provide them information necessary for contacting the other party.

Methods such as those known from U.S. Pat. No. 5,920,845 have been developed to make the process of meeting people more efficient by automating certain aspects of the process. In this method, each of the participants at a date matching event are assigned a unique identification code. The identification code is displayed in plain sight by each of the participants during the event so that it is readily observable by a plurality of other participants. Each participant is then provided a window of opportunity to introduce themselves to the other participants and interact. The date preferences for each participant are then collected and analyzed by a computer to determine all occurring mutual matches. The mutual match results are then delivered to the participants so that the match participants may then meet to discuss the arrangements for a successive date.

The prior art methods have been satisfactory. However, they suffer from the deficiency that there is no way to prevent the inefficiencies and embarrassments that arise from attending successive dating events and meeting or "mini-dating" someone for which it has already been determined that a match is not going to happen. Specifically, each person at an event such as a speed-dating event, by way of example, essentially accepts or rejects each person with whom they meet. This acceptance or rejection is done discretely on a scorecard. If for example a first man meets a second woman and does not wish to date that second woman, but the second woman wishes to date the first man, she will indicate acceptance on her scorecard while the man will indicate rejection. Therefore, in the privacy of their own homes after the event, the woman will find out that no match has occurred.

The problem arises that if they were to meet again in the future, each person would obviously be aware of the results of their original mini-date experience. The woman may be embarrassed to confront or repeat the mini-date experience with a man who had already rejected her, or the man may feel embarrassment for having rejected the woman or having to be confronted by the woman after rejection, defeating the entire purpose of the scorecard. Furthermore, both parties if forced to mini-date at a second event have wasted an opportunity to mini-date with others by spending time at a mini-date which they both know most likely has no future; there is an opportunity cost to attending an event with people one has already met.

In a second scenario, the man and the woman may meet at a speed-dating event and in fact agree through their scorecards to meet for future dating. After some period of time, the relationship may end and both may desire to return to the speed-dating process. If they both attend the same event and are forced to endure a very uncomfortable mini-date together, or if the breakup was particularly painful for the man or the woman, one of them may leave the event altogether, disrupting the event and resulting in a waste of time for the man and the woman.

In a third likely scenario, the man attends an event and meets four women. The man does not match any of the women because both the women and the man have rejected each other. However, if at some point in the future, the man and all of the women or some of the women who rejected him decide to attend another event at the same time, unbeknownst to each other, even though there may be no hard feelings in this situation, the man has now taken the time to attend an event and in most cases paid a fee, at which he will most likely not have a match with any of these women who represent a significant number of the attendees at the event. Again, this is a waste of time for the man and a waste of time for the women who would most likely have wished to see a different person in the man's position. Again, there is an opportunity cost, even where there is no discomfort, to meeting the same people.

Nothing in the prior art addresses this inefficiency and embarrassment during the social event process. Accordingly, a method for use in connection with date matching or other social events, which minimizes or prevents two people who have met at a first event from meeting at a successive event, is desired.

SUMMARY OF THE INVENTION

A method for preventing or minimizing reintroduction of two people at a successive social event includes gathering information regarding a characteristic about each individual attending an event. The characteristic has at least two potential values. A unique identifier is assigned to each participant at an event. Characteristic information regarding a characteristic having one of at least two values is gathered from each participant and the value is associated with the unique identifier. An event identifier, such as an event number, is assigned to each event. An event history of the event identifiers of each event attended by a participant is created and associated with each unique identifier such that each event history has the event identifiers for each event attended by the participant.

A desired characteristic value for a next event is chosen. A predetermined number of spots for the next event is allocated to attendees having a first characteristic value and all registering unique identifiers ("UI") having the first characteristic value are allowed to register for the second event until the event is full for attendees having the first characteristic. The event histories of unique identifiers having the second characteristic value wishing to attend the second event are then compared with the event histories of the unique identifiers having the first characteristic who have already registered for the second event. The UI having the second characteristic are allowed to register if no event match of an event number in the event history is found between the event histories of the UI having the second characteristic and any of the UIs having the first characteristic.

In a preferred embodiment, the values for the characteristic are male and female. Furthermore, the unique identifier, event histories, and the characteristic information for each unique identifier is stored in a database, with each potential attendee communicating with the database over the Internet or other communication means.

In a preferred embodiment, if in fact there is a match between an element of the event history of a unique identifier having a second characteristic and the event history of a registered UI having a first characteristic, then the UI having the second characteristic is assigned a standby status. It is then periodically determined whether or not the UI having the first characteristic who matched the UI having the second characteristic is still attending the event and if not, the UI having the second characteristic will be allowed to register. If the UI having the first characteristic and the matched event history does not withdraw from the event then that UI will be notified of the desire of the UI with the second characteristic to attend the successive event. The UI having the first characteristic will then be given the opportunity to allow the UI with the second characteristic to attend the event.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

In general, the invention is directed to preventing potential participants registering for an event from meeting the same people at a second event based on a screening criteria, which is a function of a set of rules to determine whether a previous participant may register for the next event. Generally, a potential participant registers to attend an event by providing certain identifying information about themselves, including a characteristic about themselves, most usually gender, as well as which particular event they wish to attend. The participant is assigned a permanent and unique identifying code (UI). The registration information and the unique identifying code are recorded and stored. A roster of registered participants is maintained and after the event any registrants that cancelled or did not show up are removed from the roster. A method to add people to the event whereby any people who attend the event without pre-registration or are added to the event at last minute and not on the official roster. A record of which participants have met one another is also kept.

Figure 1:
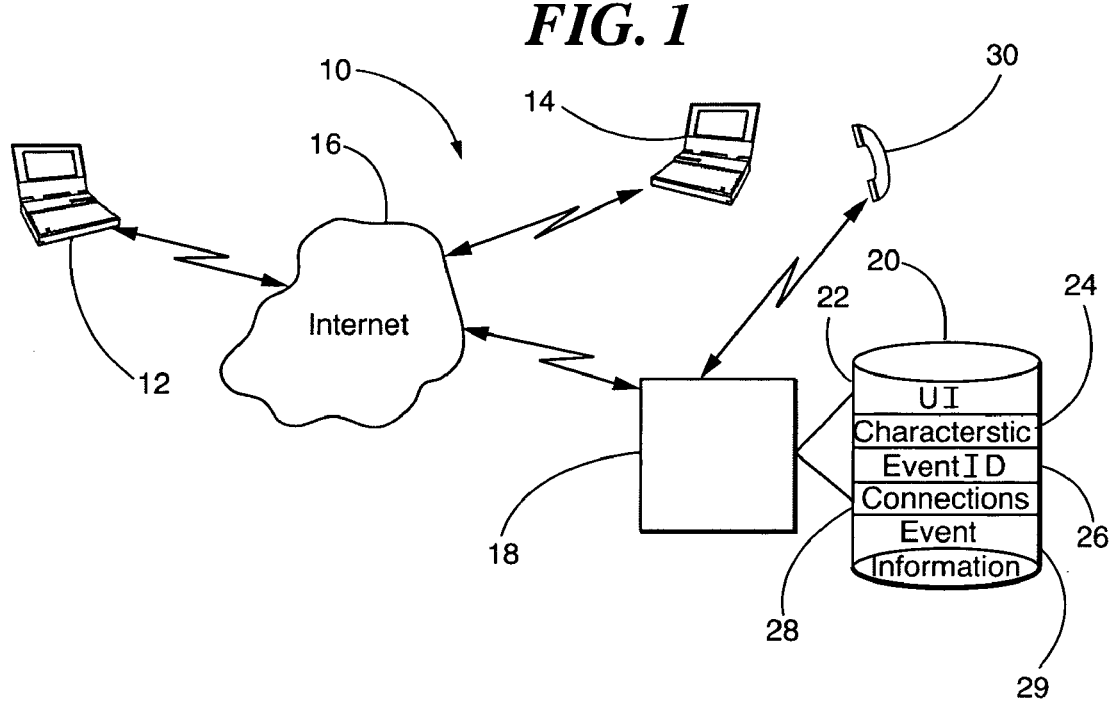
FIG. 1 is a schematic diagram of a system for performing the method in accordance with the invention.

Reference is made to FIG. 1 in which a system generally indicated as 10 for employing the method as provided. It should be noted that a computer-based Internet system is shown as a preferred embodiment for streamlining and automating the process. However, it would be understood by those skilled in the art that the methods described below can be performed manually, either in part or in whole, through the use of telephonic, facsimile or other communication and the recording of the information on paper or such other non-electronic recording medium.

Event attendees located at individual computers 12, 14 communicate over the Internet 16 with a server 18. Server 18 includes database 20 having data files 22-28. Server 18 can communicate to potential users either over the Internet 16 to computers 12, 14, or by telephone 30 through the use of automated messaging services or human messaging, by beeper or even by mail by generating correspondence to be processed by manual intervention.

Figure 2:
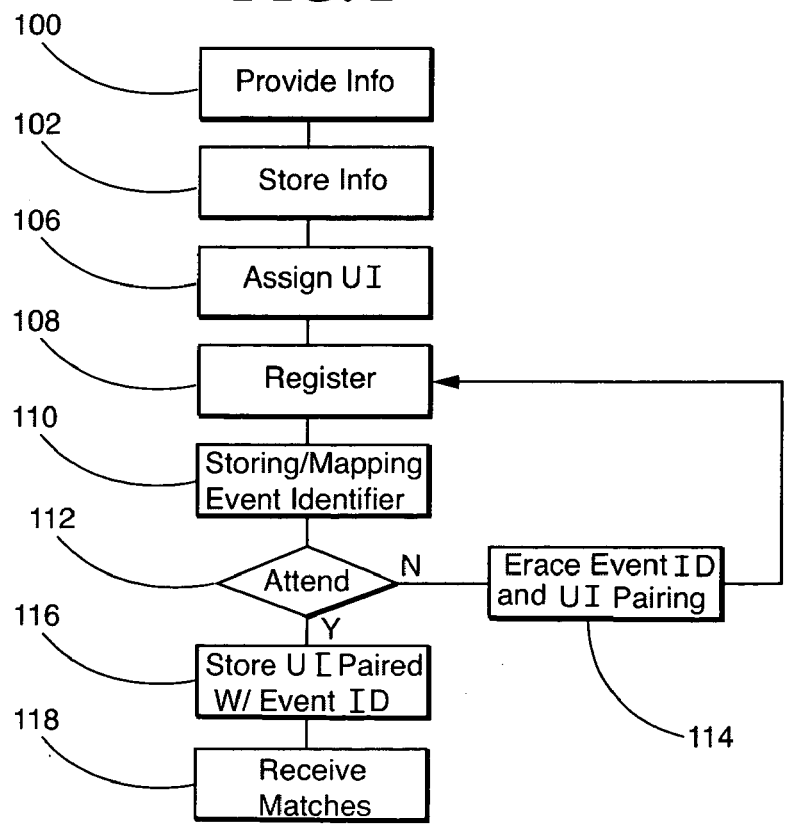
FIG. 2 is a flow chart for initially registering for an event in accordance with the invention.

Reference is now made to FIG. 2 in which a flow chart for initial registration for an event in accordance with the invention is provided. If it is the initial registration, then the user will communicate with server 18 utilizing a computer 12, by way of example, through Internet 16 or telephonically or by fax and provide certain information to the service (represented by server 18). This information may include name, age, gender, e-mail address, other contact information, and geographic locations of interest in a step 100.

In a step 102, this information is stored in a characteristic information database 24. Characteristic information is information having more than one value and which is a property or characteristic of the user which is useful in differentiating one attendee from another or grouping attendees by like interest or characteristics. For example, one characteristic is male versus female. A second characteristic for both grouping people of like interest and differentiating people could be religion or age groups. In other words, certain events may be limited to individuals of a specific religion or a specific age group.

In a step 106, each participant is assigned a unique identifier. This could be something as simple as a name, although many people have the same name, an e-mail address or name plus social security number or any other identifying combination of words and letters. This unique identifier is associated with the participant for tracking and is stored in a UI file 22 at database 20 and is mapped to the previously stored characteristic information 24.

In a step 108, the first time user registers for a desired event. Each event is given some type of event identifier. Upon registration in step 108, the event identifier, stored event identifier file 26 of database 20, is mapped to the UI of the registrant in a step 110. It should be noted that, in some embodiments of the invention, a user can select an event, then obtain their UI, rather than obtaining a UI and selecting an event as in this example.

It is then determined in a step 112 whether or not the registrant/participant actually attended the event. If the user did not attend the event, either by not showing or canceling prior to the event, then in a step 114 the stored link between the UI of the registrant and event identifier is erased. The registrant is returned to step 108 to register for another event.

If in step 112 it is determined that the registrant/participant did in fact attend the event from sign-in sheets, then, as known in the art, there will be a record from the participation scorecards discussed above of each person they had met, i.e. a connection or contact database which stores paired UIs for each meeting of each event. In a step 116, the pairs of UI's for each scored contact at the event are stored in a connection database 28. This can be done by inputting the scorecard results to server 18, by computers 12,14, telephone 30, or merely handing them to the event sponsor for manual input. For those connection pairs for which each participant indicated that they would be interested in a match, server 18 notifies each of the matched parties in a step 118 that in fact there is interest or lack of matches. Server 18 or the service 18 can notify each of the matched participants across the Internet at their respective computers 12, 14, by telephone 30, by facsimile, by pager or by mail.

At the end of this process, each attendee at an event now has a stored UI, associated characteristic information and event history consisting of the event identifiers for each event they actually attended and a connection history consisting of the UIs of each other attendee which they have met at the events they have attended.

Figure 3:
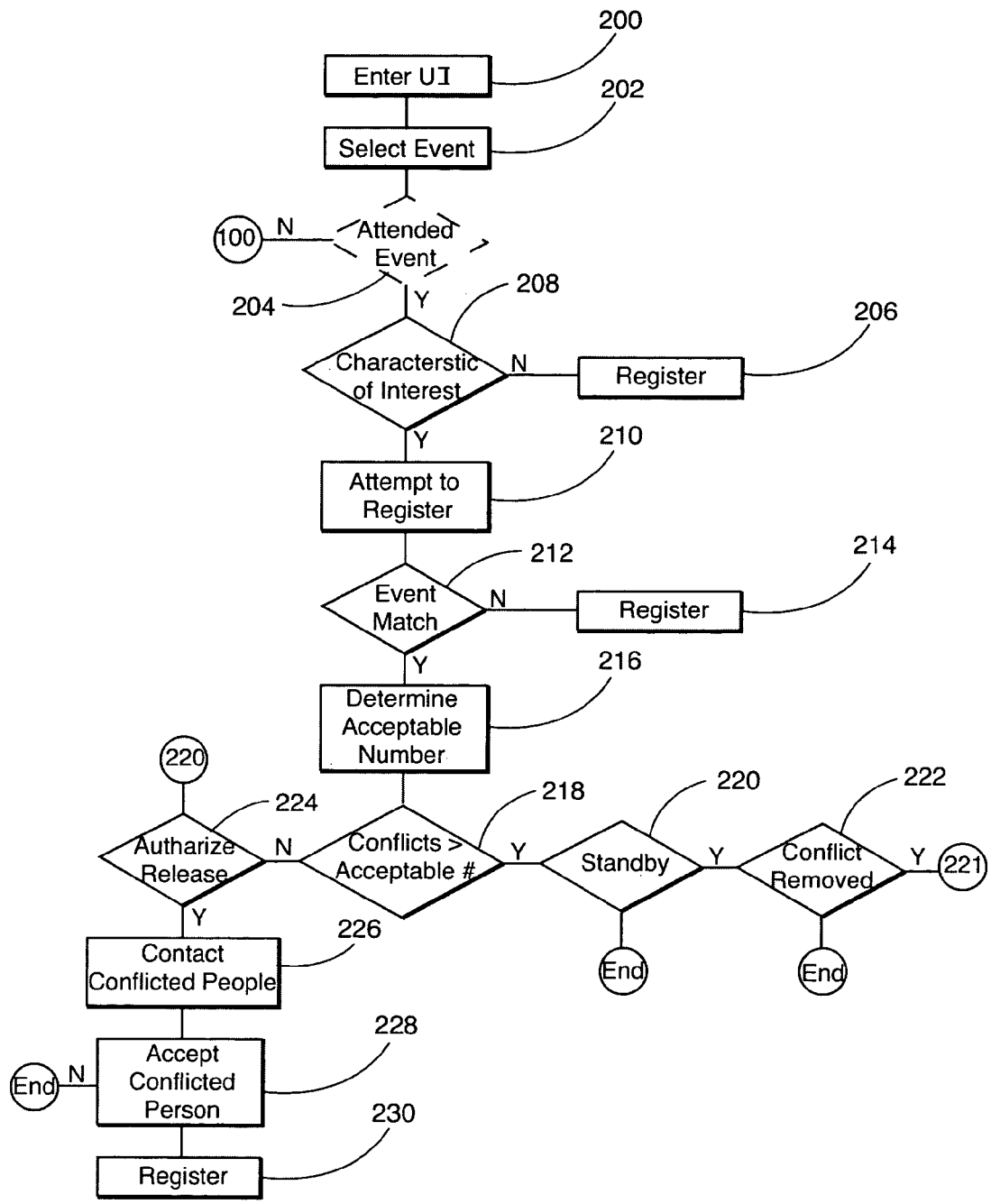
FIG. 3 is a flow chart for registering for a successive event in accordance with the invention.

It should be noted, that step 110 through 118 are repeated at each event, whether it is a first event as in FIG. 2 or a second (successive) event as discussed in FIG. 3. The information gathered in these steps will be used to prevent unwanted reintroductions to the same people at the successive events as more particularly discussed in connection with FIG. 3.

Reference is now made to FIG. 3 in which a flow chart for a method for preventing or minimizing unwanted reintroductions to event attendees is provided. In a step 200, the participant enters their UI at server 18. They then select the event, from a plurality of events stored at server 18 for which they are interested in registering. Again, the event can be selected before entering the UI. In a step 204 shown in phantom it is determined whether they have ever registered or attended an event before. If no, then the process is returned to step 100. If yes, it is determined in a step 204 whether they have the characteristic of interest for that particular event.

For ease of description, a specific characteristic, namely gender, shall be used herein to facilitate the method. Furthermore, the desired characteristic as will be seen below will be that characteristic which is being screened for registration at the event. In other words, it is the characteristic, if associated with a UI, which will initially prevent registration. In this example, the desired characteristic is being female. Therefore, in step 204 if it is determined a prospective registrant is male (not female) they will be allowed to immediately register assuming the event is not full in step 206.

In a preferred embodiment, each event is designed to have a predetermined number of attendees. Furthermore, the number of male attendees and female attendees is preferably equally divided. Therefore, half of the available slots are reserved for each gender. Men will be allowed to register in steps 204, 206 until the registered male slots are full. After that men will be placed on a waiting list, having to wait for either a determination that more men can register or previously registered men cancel.

If it is determined that the UI corresponds to the gender of interest, then logic rules are applied to determine whether or not that person can register. The goal of the logic rules is to prevent the registration of a UI corresponding to a characteristic of interest, namely gender, where they have already attended an event with someone of the other gender who has registered. By way of example, one part of the logic rule is determining in a step 208 whether a matching gender, male, has filled the available slots for the male gender, i.e. the maximum number of men have registered. If not, the potential female participant is effectively put on a standby list by in effect repeating step 208 until the matching gender is considered to have filled all of their allotted slots. As the date of event approaches, the event service provider may in fact declare the matching gender to have filled its capacity even if less than half of the allotted slots have been taken. The standby list members are stored in database 20.

If in fact the matching gender slots are full, as determined in step 208, then the female participant attempts to register in a step 210. In step 210, the UI is utilized along with the associated characteristic information and the associated event identifier history. In a step 212 the event attendance history of the female participant attempting to register in 210 is compared to the event attendance history of each man who has registered in step 206. It is determined whether or not there is a match of any event. If not, then the woman registers in a step 214.

It should be noted that with the use of computers capable of maintaining data and comparing large amounts of data, rather than comparing event histories, the method can compare the UI of the woman attempting to register with the contact history for the UI of each of the registrants from step 206 to determine whether or not the two have in fact met based on the data stored in connection database 28. In this way, even if the two had attended the same event, if they had not met, the woman would be allowed to register in step 214. However, use of the event identifier guards against any errors in the contact database based upon faulty input of scorecard data or where any previous event did not use a scorecard.

However, if there is a match, the woman would be prompted, at this point, to determine whether or not there is a minimum number of repeat introductions that would be acceptable to her. In other words, if the registered men from step 206 had attended a previous event that she had attended, what number of those men would lead to her making a decision not to attend the successive event for which she is trying to register. This information can be entered at this point, when entering characteristic data, when registering for the event, or when initially placed on standby.

In a step 218, it is then determined whether the number of conflicts, i.e. whether the number of matched men (conflicted men) from the registered pool of men who registered in step 206 is greater than her acceptable number. If yes, she will be given the option of being placed on a standby list in a step 220 to await any change in status of the registrants for the event, which would change the outcome of step 218. If she declines being placed on the standby list, then the process ends. If she decides to be placed on the standby list, then the current registration list as determined from step 206 is periodically checked in step 222. If the conflict is removed, in other words the number of conflicted registrants from step 206 is no longer greater than her acceptable number of potential reintroductions, the method proceeds to step 224. If the conflict is not removed, then in effect she has never been removed from the standby list and the process ends and she will be notified that she was unable to register. Notification can be to her e-mail at computers 12, 14, at telephone 30, by pager (not shown), or even, if done manually, by facsimile, letter or human voice telephone.

If in step 218 it is determined that the number of potential reintroductions, conflicted registrants from step 206, is at or below the acceptable number of potential reintroductions, then in a step 224 the woman will then make a decision to authorize the release of her information to the conflicted registrants. She may decide not to release her information to avoid embarrassment. If she declines to release her information to the other registrants, she will either be initially placed on or returned to the standby list at step 220. However, she can change her mind and authorize release at any time. If she authorizes the release of her information, the conflicted registrants will be contacted in a step 226. Again, the registrants may be contacted at PCs 12, 14, over the Internet 16, and by telephone, pager or facsimile as discussed above. In this way, each of the conflicted registrants is given the opportunity to avoid embarrassment or their perceived waste of time by barring registrants of the opposite sex with whom they have already met and have made a decision not to proceed further.

In step 228, each of the conflicted registrants is given an opportunity to accept or reject the potential registrants. If they reject the potential registrant, the process is ended. If she is accepted by each of the conflicted registrants, she will register in a step 230. Once she has registered, her event history will be amended as discussed above.

It should be noted, that the potential registrant, i.e., the person who has been conflicted out and is on standby waiting to be allowed to register can change the parameters in step 218. In other words, if in our example the woman decides that the event will be so beneficial that she is willing to change her tolerance level for the possibility of repeat meetings, she may wish to raise the number of acceptable possible conflicts in step 218. In one embodiment, she will be provided the opportunity to change the parameters of step 218 while on the standby list by communicating with service provider or server 18.

Figure 4:
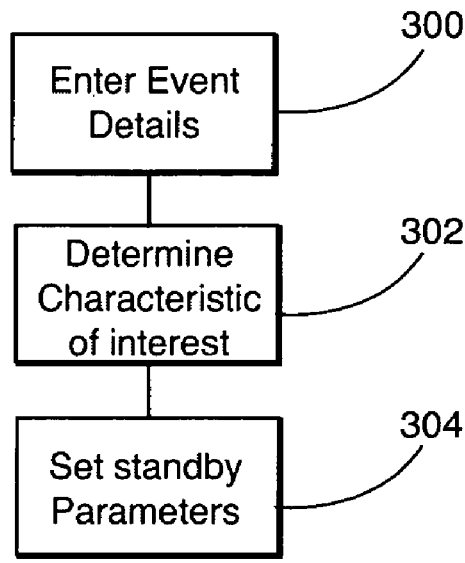
FIG. 4 is a flow chart for setting the parameters for controlling the characteristics of interest in accordance with the invention.

Reference is now made to FIG. 4 in which a method for enabling an event for use in connection with the method for preventing reintroductions at a successive social event is provided. In a step 300, a new event is planned, and the event particulars are stored at server 18 in database 20 in an event file 29. In order to establish the information, determinations are made by the event organizer as to which, if any, characteristic of potential participants shall be established as the characteristic of interest. In accordance with our example, whether men or women or both will be able to register automatically without needing to avail themselves of the standby screening rules. This determination is made in step 302.

Figure 5:
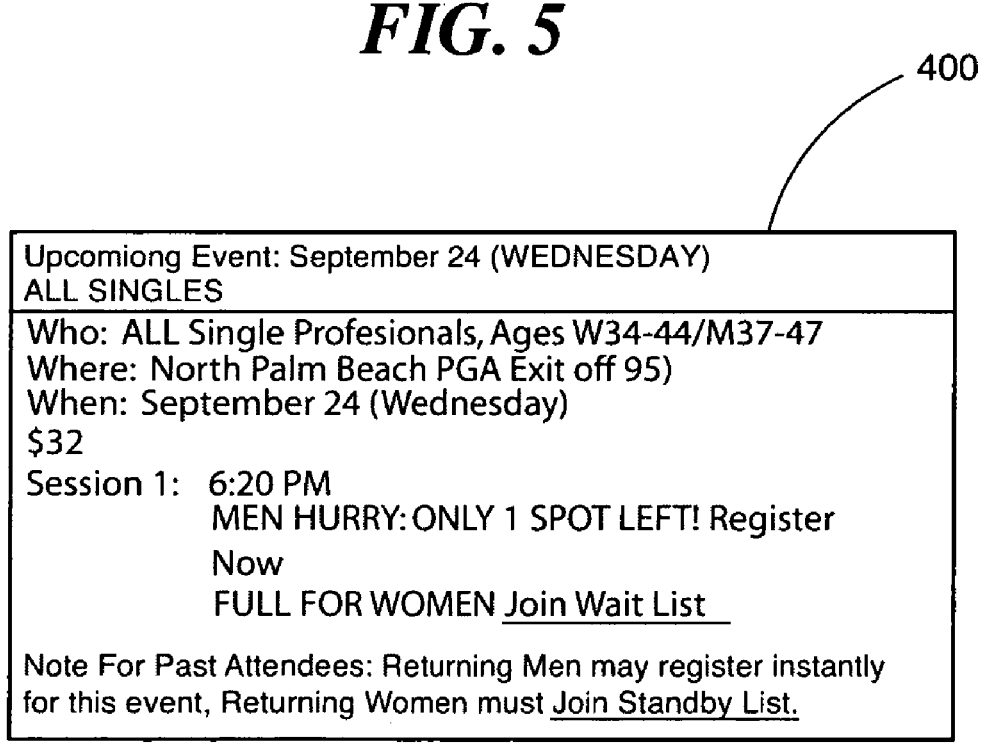
FIG. 5 is a screen shot presented in accordance with the invention.

The service either manually by way of fliers or electronically through server 18 makes the event information available by posting on a website, by email transmissions to PCs 12, 14 or other known means. A screenshot 400 as shown in FIG. 5 will identify the pertinent information regarding the event such as the date, time and characteristic of interest. In the example of screenshot 400, men would be allowed to register immediately while women would be placed on the standby list as discussed above. Furthermore, it should be noted that two criteria are being screened; one for a portion of the population and one for the entire population. In this example, the event is only open to women ages 34-44 and men 37-47. Therefore, an initial screening of all applications for the age characteristic occurs. This occurs merely by comparing the age characteristic information which travels along with the UI of each potential registrant to determine whether or the not the age falls within the desired parameters, and rejecting them outright or allowing them to pass as a function of age. As discussed above, the entire screen characteristic could be any characteristic including a gender characteristic for homosexual activities, a religion characteristic, even a geographical characteristic if wishing to limit the event to people in the neighborhood.

It should also be noted that should the event organizer opt not to have a determining characteristic, the system and method would still apply, but the screening criteria would not be event number, but rather whether or not the UIs have ever filled out a scorecard with respect to each other. In other words, the initial screening would be on an individual basis from the outset.

In a step 304, the organizer can set the standby list parameters. These parameters may include the manner in which standby list participants are notified, either by personal phone call or by automated responses such as emails or artificial intelligence phone calls. Furthermore, the parameters for selecting people from the standby list can also be set. A typical default may be first come, first served, so that the first person assigned to a standby list is automatically the first person screened or selected. However, the server may wish to reward loyal customers and therefore rearrange the list so that those who have attended the most events are moved to the front of the line or even utilizing a random number generated to make sure that the line is exceptionally large, selection from the standby list is subjective and fair.

Furthermore, the event organizer may even select a window of opportunity prior to an event whereby the standby list rules would be changed so that someone on the standby list would be invited to register even if the event is not full of the desired characteristic registrants. By way of example, if the maximum capacity for men is twelve for an event prior to inviting women, and only ten men have registered twenty-four hours prior to the event, the server 18 could automatically invite standby members to conditionally attend so long as the maximum number of conflicts has not been reached.

Finally, there is the situation that someone from the standby list has passed all the screens and is allowed to register. After that occurs, the registrant with the desired characteristic who registered in step 206 cancels out and is replaced. This new replacement registrant may have a conflict situation as discussed above with the registrants who registered from the standby list. In this case, the system would notify the event organizer regarding the conflict who can then intervene to resolve the conflict. If automated, the replacement registrant from step 206 could be placed on standby beginning at step 220 as discussed above.

Although a specific embodiment of the present invention is detailed herein with reference to the accompanying drawings, it is to be understood that the invention is not limited to that precise embodiment and that various changes and modifications may be effected therein by one skilled in the art without departing from the spirit and scope of the invention as defined in the appended claims.

What is claimed is:

1. A method for minimizing the reintroduction of two people at a successive social event comprises the steps of:
   assigning each person wishing to attend a first and the successive social events a unique identifier;
   obtaining characteristic information about each person wishing to attend the successive social event, the characteristic information having at least two potential values;
   assigning an event identifier to at least said first social event and said successive social event;
   creating an event history associated with each unique identifier, the event history having elements corresponding to information associated with each event the person associated with the unique identifier has attended;
   allowing a person to attend the successive social event dependent upon a rule for screening attendees, said rule being a function of said characteristic information and said event history;
   selecting a first characteristic information value;
   assigning a first predetermined number of slots for the successive social event;
   allowing all persons with the first characteristic value to register for the successive social event until all of the first predetermined number of slots are filled;
   assigning a second predetermined number of slots for a successive social event to persons having a second characteristic value, the second characteristic information value having a value not equal to the first characteristic information value; and
   comparing the event history of each person wishing to attend the successive social event having the second characteristic information value with the event history of each registered person having the first characteristic information value, and barring registration of the person having the second characteristic information value if an element of the event history of the person having the second characteristic information value matches an element of the event history of the registered person having the first characteristic information value.

2. The method of claim 1, wherein said element is the event identifier for an event other than the successive social event.

3. The method of claim 1, wherein said element is a contact history for each person.

4. The method of claim 1, further comprising the step of placing a person who has been barred from registration on a standby list;
   periodically determining whether the bar to registration has been removed; and
   allowing the barred person to register for the successive social event if the bar has been removed.

5. The method of claim 1, wherein said characteristic information of the barred person includes a predetermined number of matches of an element acceptable to the barred person.

6. The method of claim 5, wherein said person with said second characteristic information value may change the predetermined number of matches while on the standby list.

7. The method of claim 5, wherein if the number of matches does not exceed the predetermined number, the person having the second characteristic information value authorizes release of at least a portion of said characteristic information and event history to those persons having the first characteristic information value, said persons having the first characteristic information value and at least one element match determining whether said person with said second characteristic information value may register.

8. The method of claim 7, wherein characteristic information includes at least the name of the person with said second characteristic information.

9. The method of claim 2, wherein the characteristic information includes gender.

10. The method of claim 1, further comprising the steps of providing a server, said server assigning each person wishing to attend the first and the successive social events a unique identifier;
    said server obtaining and storing characteristic information about each person wishing to attend the first and the successive social events; and
    said server assigning an event identifier to each event and creating the event history.

11. The method of claim 10, wherein a person provides characteristic information to the server across the Internet.

12. The method of claim 10 wherein said server applies the rules for screening attendees to each unique identifier and associated characteristic and event history associated with a person wishing to attend the successive event.

13. The method of claim 10, wherein the event history, characteristic information and unique identifiers are stored at the server.

14. A system for minimizing the reintroduction of two people at a successive social event comprising:
    a server; and
    an input means remotely coupled to the server for inputting data to said server, said remote input means communicating with the server to input characteristic information about each person wishing to attend the successive social event, said characteristic information having at least two potential values, the server assigning each person wishing to attend the successive social event a unique identifier, said server assigning an event identifier to at least the first social event and the successive social event and storing the event identifier in a database, and creating an event history associated with each unique identifier, the event history having elements corresponding to information about each event the person associated with the unique identifier has attended, the server determining whether a person may attend the successive social event dependent upon a rule for screening attendees, said rule being a function of the characteristic information and the event history
    said server selects a first characteristic information value and assigns a predetermined number of slots for the successive social event to persons with the first characteristic value;
    said server assigning a second predetermined number of slots for a successive social event to persons having a second characteristic information value, the second characteristic information value having a value not equal to the first characteristic information value;

said server compares the event history of each person wishing to attend the successive social event having the second characteristic information value with the event history of each registered person having the first characteristic information value, and bars registration of the person having the second characteristic information value if an element of the event history of the person having the second characteristic information value matches an element of the event history of the registered person having the first characteristic information value; and notifies the person having the second characteristic information value at the input means that said person having the second characteristic information has been barred from registration to the successive social event.

15. The system of claim 14, wherein said input means is one of a personal computer and telephone.

16. The system of claim 15, wherein the input means is connected to the server across the Internet.

17. The system of claim 14, wherein when said server has a standby list database and stores the unique identifier of the persons barred from registration in the standby list database, the server periodically determining whether the bar to registration has been removed; and allowing the barred person to register for the successive social event if the bar has been removed.

18. The system of claim 14, wherein said characteristic information of the barred person includes a predetermined number of matches of an element acceptable to the barred person and, if the number of matches does not exceed the predetermined number, the person having the second characteristic information value authorizes release of at least a portion of characteristic information to those persons having the first characteristic information value, said persons having the first characteristic information value and at least one element match determining whether said person with said second characteristic information value may register.

* * * * *